United States Patent [19]
Darwood

[11] 3,903,369
[45] Sept. 2, 1975

[54] TELEPHONE ANSWERING SYSTEM WITH REMOTE PLAYBACK

[75] Inventor: James R. Darwood, Paramount, Calif.

[73] Assignee: T.A.D. Avanti, Inc., Paramount, Calif.

[22] Filed: Apr. 15, 1974

[21] Appl. No.: 460,921

[52] U.S. Cl. .................... 179/6 E; 179/6 R; 360/72
[51] Int. Cl.$^2$ ....................... H04N 7/00; G11B 15/18
[58] Field of Search .................. 179/6 R, 6 E, 6 AC; 360/72, 137

[56] References Cited

UNITED STATES PATENTS

| | | | |
|---|---|---|---|
| 3,136,856 | 6/1964 | Zimmermann | 179/6 E |
| 3,337,690 | 8/1967 | Martin | 179/6 E |
| 3,499,993 | 3/1970 | Owen et al. | 179/6 E |
| 3,673,332 | 6/1972 | Muller et al. | 179/6 E |
| 3,798,382 | 3/1974 | Hoven | 179/6 R |

*Primary Examiner*—Daryl W. Cook
*Assistant Examiner*—Stewart Levy
*Attorney, Agent, or Firm*—Jessup & Beecher

[57] ABSTRACT

A magnetic tape-type of telephone answering system is provided which is capable of being operated from a remote point. Remote control is achieved, in the embodiment to be described, by the calling party transmitting a single tone of a predetermined frequency over the telephone line for a short time interval. In response to the tone, the telephone answering system automatically rewinds the message tape to its origin position, and it then plays back all the accumulated messages recorded on the message tape and causes the messages to be transmitted to the calling party over the telephone line. The system to be described contains an up-down counter which counts up to a particular count as the message tape is being rewound under the remote control, and which then counts down to zero as the messages on the message tape are played back and transmitted over the telephone line. The message tape is automatically stopped after the last message has been played back and transmitted to the calling party, and the system is again set to its normal operational mode to respond to any additional messages which may be received. The system is also capable of a remote backspace control, which is effectuated by transmitting the tone during the playback mode, and after a predetermined time has elapsed from the initiation of the playback mode. The amount of backspace is determined by the duration of the tone signal transmitted during the playback mode.

5 Claims, 1 Drawing Figure

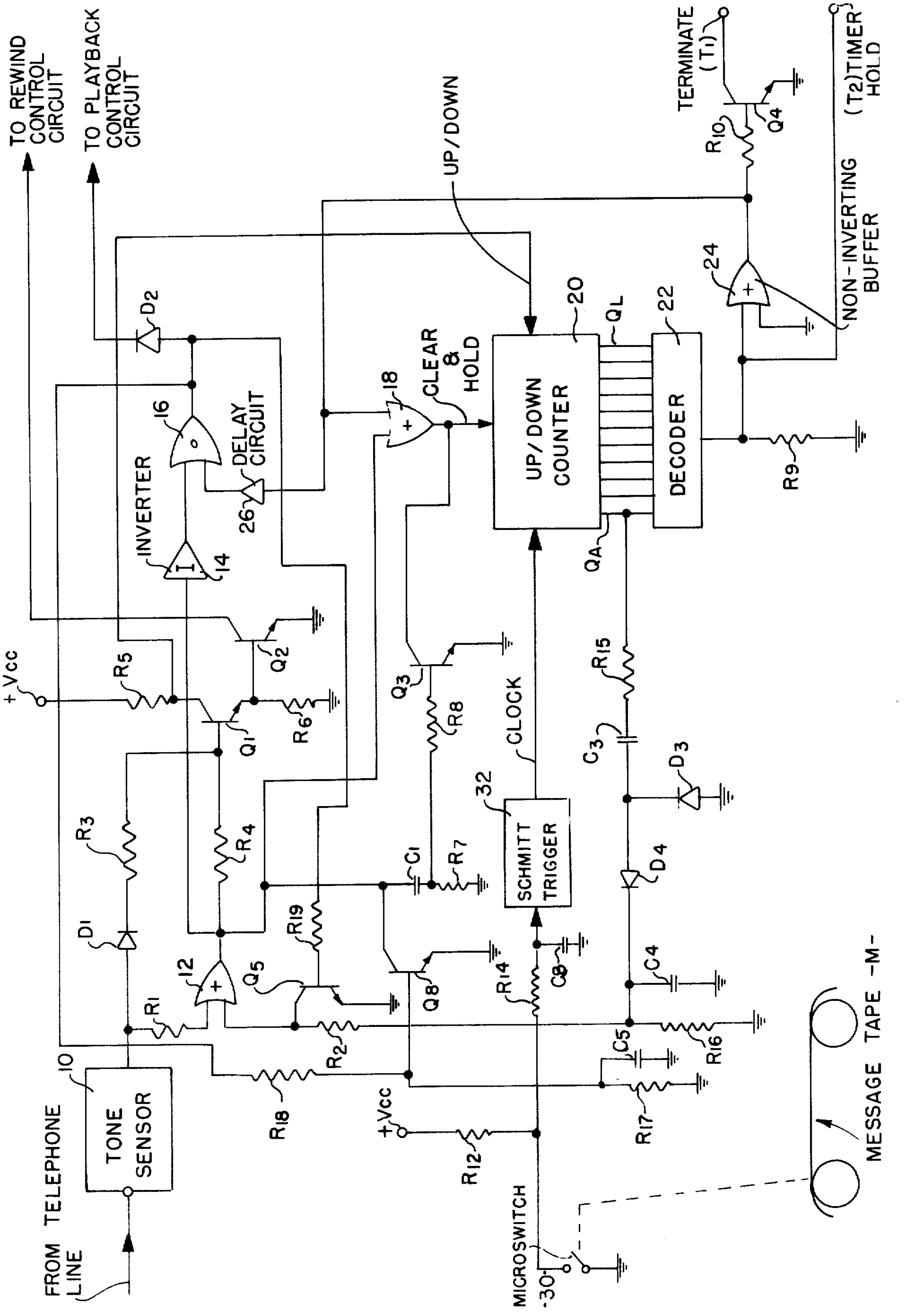
FROM TELEPHONE LINE
TONE SENSOR
10
TO REWIND CONTROL CIRCUIT
TO PLAYBACK CONTROL CIRCUIT
+Vcc
INVERTER
14
16
DELAY CIRCUIT
26
18
CLEAR & HOLD
UP/DOWN
UP/DOWN COUNTER
20
DECODER
22
QL
QA
CLOCK
SCHMITT TRIGGER
32
NON-INVERTING BUFFER
24
TERMINATE (T1)
(T2)TIMER HOLD
MICROSWITCH
-30-
MESSAGE TAPE -M-
12
Q1
Q2
Q3
Q4
Q5
Q8
R1
R2
R3
R4
R5
R6
R7
R8
R9
R10
R12
R14
R15
R16
R17
R18
R19
C1
C3
C4
C5
C8
D1
D2
D3
D4

TELEPHONE ANSWERING SYSTEM WITH REMOTE PLAYBACK

BACKGROUND OF THE INVENTION

The telephone answering system of the invention is of the same general type as described in U.S. Pat. No. 3,757,049 which issued Sept. 4, 1973, and which is assigned to the present assignee.

The telephone answering system described in the patent includes an announcement tape which is activated during an announcement interval ($T_1$) in response to a telephone call, and which causes a recorded announcement on the announcement tape to be transmitted to the calling party over the telephone line during that interval. At the end of the announcement interval ($T_1$), a message tape is activated, and it records the message from the calling party during an ensuing time interval ($T_2$). The time interval $T_2$ may be of any predetermined length, or it may continue, within the limits of the system, for as long as the calling party is talking.

The telephone answering system described in the patent is capable of remote control, which enables the user of the system to call from any part of the world, and to activate the system and cause the system to transmit to the caller all of the accumulated messages previously recorded on the message tape. This is achieved in the system described in the patent by means of a small portable transmitter unit which is held by the caller up to the mouthpiece of the telephone, and which is push-button controlled to transmit tone signal bursts of a predetermined frequency over the telephone line.

The system of the present invention is concerned with an improved type of such a remote control system by which the telephone answering system responds to a single tone signal burst of brief duration automatically to perform all the operations necessary to transmit the accumulated messages on the message tape to the distant caller.

BRIEF DESCRIPTION OF THE DRAWING

The single FIGURE is a schematic diagram, partly in block form and partly in circuit detail, of the portion of a telephone answering system which incorporates circuitry embodying the present invention in one of its aspects.

DETAILED DESCRIPTION OF THE DRAWING

The illustrated circuit includes a tone sensor designated by the block 10 which is coupled to the telephone line. The tone sensor 10 may be in the form of a filter circuit which passes only the burst of tone frequency transmitted over the telephone line for a brief interval, when it is desired that the associated telephone answering system perform the remote control function.

The tone sensor 10 is connected to a resistor R1 and to the anode of a diode D1. The cathode of the diode D1 is connected to a transistor R3 which, in turn, is connected to the base electrode of an NPN resistor Q1. The resistor R1 is connected to an "or" gate 12 which, in turn, is connected to a resistor R4 and through an inverter 14 to an "and" gate 16.

The resistor R4 is also connected to the base electrode of the NPN transistor Q1. The emitter of the transistor Q1 is connected to a grounded resistor R6 and to the base of a grounded emitter NPN transistor Q2. The collector of the transistor Q1 is connected through a resistor R5 to the positive terminal of a direct voltage source. $V_{cc}$. The collector of the transistor Q1 is also connected to an up-down counter 20 to control the up or down count mode of the counter.

The collector of the transistor Q2 is connected to the rewind control circuit of the associated telephone answering system, and when the transistor Q2 is conductive, and its output goes low, the rewind control circuit is activated to rewind the message tape M of the telephone answering system back to its origin position. The "and" gate 16 is connected through a diode D2 to the playback control circuit of the associated telephone answering system, and when the and gate 16 is conductive its output goes high, and the playback control circuit is activated. This causes the message tape M to move forward from its origin position, so that the recorded messages on the message tape may be played back and transmitted to the calling party over the telephone line.

The output of the or gate 12 is also connected to an or gate 18 and to a capacitor C1. The capacitor C1 is connected to a grounded resistor R7 and through a resistor R8 to the base of a grounded emitter NPN transistor Q3. The collector of the transistor Q3 is connected to the up-down counter 20. The output of the or gate 18 is connected to the up-down counter 20 to set and hold the counter in its cleared condition if both inputs to the or gate 18 are low.

When the transistor Q1 is conductive, its output is low, and the up-down counter 20 is conditioned to count up. Conversely, when the transistor Q1 is nonconductive, its output is high, and the up-down counter 20 is conditioned to count down. Therefore, whenever the telephone answering system is controlled to rewind the message tape M to its origin position, the up-down counter 20 counts up to a predetermined count, and when the system is controlled to cause the message tape to move forward and play back the messages recorded thereon, the up-down counter counts back down towards its zero, or reference position.

The message tape transport M is mechanically coupled to a microswitch 30, or other suitable sensor, and it causes the microswitch to close and open for each revolution of the feed reel of the message tape transport. The microswitch 30 is connected to a resistor R12 and to a resistor R14. The resistor R12 is connected to the positive terminal of the source $V_{cc}$. The resistor R14 is connected to a grounded capacitor C8 and to a Schmitt trigger 32. The Schmitt trigger supplies clock pulses to the up-down counter 20.

The up-down counter 20 is connected to a decoder 22, and the decoder develops an output across a grounded resistor R9 whenever the counter 20 departs from its zero count. The resistor R9 is connected to the timer circuit of the associated telephone answering system, and it serves to de-activate the timer circuit whenever an output appears across the resistor R9, indicating that the counter has been moved from its zero count and that the system is under remote control. This assures that the timer circuit of the telephone answering system will be rendered ineffective throughout the remote control operation.

The resistor R9 is also connected through a non-inverting buffer 24 to the or gate 18, and through a delay circuit 26 to the and gate 16 to enable the and gate whenever the output appears across resistor R9. The buffer 24 is also connected through a resistor R10 to the base electrode of a grounded emitter transistor Q4.

The collector of the transistor Q4 is connected to the control circuit of the associated telephone answering system, so that if a remote control tone is received during the announcement interval ($T_1$), the announcement interval is interupted, and the system is switched to the message mode ($T_2$). This enables the remote control to take over immediately, without waiting for the end of the announcement interval, should the tone be transmitted during the announcement interval, so that the operations whereby the recorded messages may be played back and transmitted to the calling party may be commenced without delay.

The least significant bit lead ($Q_A$) connecting the up-down counter 20 to the decoder 22 is connected to a resistor R15 which, in turn, is connected through a capacitor C3 to a grounded diode D3 and to a diode D4. The diode D4 is connected to a grounded resistor R16 and to a grounded capacitor C14, and through a resistor R2 to the or gate 12. The output of the and gate 16 is connected through a resistor 18 to the base of the transistor Q8, and to a grounded resistor R17 and grounded capacitor C5. The collector of the transistor Q8 is connected to the capacitor C1.

When the telephone answering system is operating normally, the up-down counter 20 is cleared and it is held in its zero count state since the output of the or gate 12 as applied as one input to the or gate 18 is low. The other input to the or gate 18 is also low, since the counter 20 is in its zero state, and no voltage is developed across the resistor R9 by the decoder 22. The up-down counter, therefore, is unresponsive to pulses from the Schmitt trigger 32, even though the message tape M may be operating, and the microswitch 30 may be actuating the Schmitt trigger.

However, when a tone of the predetermined frequency is transmitted over the telephone line to the telephone answering system, the tone sensor 10 develops an output which is applied to the or gate 12 to cause its output to go high which, in turn, causes the or gate 18 to remove the clear control from the up-down counter 20 so that the counter may respond to clock pulses from the Schmitt trigger as the microswitch 30 is opened and closed. The output from the or gate 12 also causes the transistors Q1 and Q2 to become conductive, so that the telephone answering system may be placed in its rewind mode to return the message tape M to its origin position.

As long as the counter 20 is operating, pulses appear on the least significant bit lead ($Q_A$), and these pulses maintain the capacitor C4 charged to provide a latch control through the or gate 12 for the rewind mode. Specifically, this latch control holds the output of the or gate 12 high, so as to cause the transistors Q1 and Q2 to remain conductive, thereby continuing the rewind mode. When the message tape M has been returned to its origin position, the feed reel stops turning and the microswitch 30 is no longer operated, so that the capacitor C4 discharges through the resistor R16. The latch control is thereby removed and the output of the or gate 12 goes low and the transistor Q1 becomes non-conductive. This causes the transistor Q2 to return to its non-conductive state, and the rewind control circuit of the telephone answering system to be deactivated.

During the rewind operation, the transistor Q1 is conductive, so that its collector output is low, and the counter 20 counts up in response to the clock pulses from the Schmitt trigger 32. When the message tape M has returned to its origin position and the rewind operation is terminated, the counter 20 will have counted to a count corresponding to the distance between the end of the last message recorded on the message tape and the origin position of the message tape.

When the origin position of the message tape M has been reached at the end of the rewind mode, and when the capacitor C4 has discharged to remove the latch control from the or gate 12, the resulting low output of the or gate, as inverted by the inverter 14, is passed to the and gate 16. At this time, the and gate is enabled, due to the fact that the counter has counted away from zero, and a voltage appears across the resistor R9, causing the output of the non-inverting buffer 24 to go high. Therefore, when the output of the inverter 14 goes high, the and gate 16 becomes conductive, causing its output to go high. As the output of the and gate 16 goes high, the playback control circuit of the telephone answering system is activated so that the messages on the message tape may be played back and transmitted in sequence over the telephone line to the calling party.

Also, during the playback mode, the transistor Q1 is non-conductive, so that its output is high, and the up-down counter 20 is actuated to its "count down" mode. The counter therefore counts back down to its zero position as the microswitch 30 is actuated during the playback mode of the message tape M. Unless a backspace operation is initiated, as will be described, the playback operation will continue until the counter has counted back down to zero. Then, after a slight delay by the delay circuit 26 to assure that the last message on the tape has been completely played back, the output from the delay circuit goes low to render the gate circuit 16 non-conductive and thereby to terminate the playback operation. When the up-down counter returns to zero, the output of the buffer 24 goes low, as applied to the or gate 18, thereby serving as a hold control on the counter to render the counter unresponsive to clock pulses from the Schmitt trigger 32 until the next tone signal of the predetermined frequency is sensed by the tone sensor.

The output of the and gate 16 is also introduced through the resistor R19 to the base of the NPN transistor Q5. During the playback mode when the output of the and gate 16 is high, the transistor Q5 is rendered conductive. This serves as a latch control, and it prevents the or gate 12 from being latched in the rewind mode by the charge on the capacitor C4 as the counter 20 goes through further operation.

As explained above, the decoder 22 develops a voltage across the resistor R9 whenever the up-down counter 20 counts away from zero, thereby to indicate the start of a remote control operation. This voltage is used to place a hold on the timer circuit of the telephone answering system as described above, so that the telephone answering system will remain active, and will not "hang up" for the duration of the remote control operation. As also explained, the voltage across the resistor R9 is also used to render the transistor Q4 conductive, so that the announcement mode ($T_1$) of the telephone answering system is immediately terminated at the beginning of the remote operation, should the remote operation be started during the announcement interval ($T_1$).

A predetermined time after the initiation of the aforesaid playback operation, a backspace operation may be interposed into the system. This control is effectuated in the following manner. The output of the and gate 16 goes high when the playback mode is initiated, and it remains high for the duration of the playback mode. When the output of the and gate 16 goes high, the capacitor C5 is charged through the resistor R18 and, after a predetermined time interval, the transistor Q8 is rendered conductive. This time interval may be selected to any desired value. For example, it may be of the order of 10 seconds.

When the transistor Q8 is rendered conductive, it forms a short circuit across the capacitor C1 and resistor R7, so as to prevent any further operation of the transistor Q3 to clear the up-down counter 20. Now, should a tone signal of the predetermined frequency be transmitted, the resulting output of tone sensor 10, although passed through the or gate 12, is ineffective in resetting the up-down counter 20. However, the sensor output is introduced to the base of the transistor Q1 through the diode D1 and resistor R3, so that the transistor Q1 and the transistor Q2 are both rendered conductive. When the transistor Q1 is rendered conductive, its collector output goes low, so that the control of the up-down counter 20 is switched from "up" to "down". Also, the conductivity of the transistor Q2 causes the rewind control circuit of the telephone answering system to become effective.

In this way, so long as the tone signal persists, the rewind control circuit of the telephone answering system turns the message tape M in the backward direction, and the counter 20 counts down a corresponding amount. When the tone signal is terminated, the system immediately reverts to the playback mode, and the backspaced messages are transmitted again to the remote caller. The system then proceeds to playback and transmit messages to the calling party in the usual manner until the termination of the playback mode.

At the end of the playback mode, a tone can again be transmitted over the telephone line to cause the system to rewind to its origin position in the same manner as described above. Again, when the message tape is rewound to its origin position, the system automatically switches to the playback mode, as described, and begins to play back the recorded messages.

Now, if a further tone is transmitted over the telephone line before the ten second predetermined time has elapsed and the capacitor C5 has not charged sufficiently to render the transistor Q8 conductive, then the resulting output of the tone sensor 10 passed through the or gate 12 is effective to produce a pulse across the resistor R7 which turns the transistor Q3 on to clear the up-down counter to zero.

The sensor output is also introduced to the base of the transistor Q1 through the diode D1 and resistor R3 so that both transistors Q1 and Q2 turn on and the message tape is rewound to its origin position. The output of the buffer 24 now goes low, and when the tone is terminated both inputs to the or gate 18 are low to cause the or gate 18 to hold the counter 20 in its zero position. In this way the system is reset, and is ready to respond to and record a new set of messages.

The invention provides, therefore, an improved and simplified remote control for a telephone answering system, by which a single tone transmitted by the calling party may be used to cause the system to playback all the messages recorded on the message tape, and may also be used to introduce backspace operation into the system, as desired.

Although a particular embodiment of the invention has been shown and described, modifications may be made. It is intended in the claims to cover the modifications which fall within the spirit and scope of the invention.

What is claimed is:

1. In a telephone answering system for responding to telephone messages received over a telephone line and which includes a message storage means for recording the messages, the combination of: a tone sensing circuit coupled to the telephone line for sensing a tone signal of a predetermined frequency received over the line and for producing an output in response thereto; first circuit means coupled to said tone sensing circuit and responsive to said output for introducing a rewind control signal to the telephone answering system and to cause said message storage means to return to a reference position; an up-down counter for measuring the displacement of said message storage means from its reference position; second circuit means coupled to said up-down counter for terminating said rewind signal when said message storage means is returned to said reference position and for then introducing a playback control signal to the telephone answering system to cause the telephone answering system to transmit the messages recorded on said message storage means over the telephone line; third circuit means coupled to said message storage means for introducing clock pulses to said up-down counter when said message storage means is activated; and fourth circuit means coupled to said second circuit means for causing said up-down counter to count from a reference count to a further count as said message storage means is being returned to its reference position, and for causing said up-down counter to return to its reference count as the telephone answering system is transmitting the messages recorded on said message storage means, said second circuit means terminating the introduction of said playback control signal to the telephone answering system when said up-down counter returns to its reference count.

2. The combination defined in claim 1, and which includes circuitry connected to said first and second circuit means and responsive to said tone signal received after a predetermined time after the commencement of playback when the messages recorded on said message storage means are being transmitted over the telephone line to re-introduce said rewind signal to the telephone answering system to cause said message storage means to backspace for a duration determined by the duration of the received tone signal.

3. The combination defined in claim 2, and which includes further circuit means connecting said last-named circuitry to said up-down counter, to cause said up-down counter to count down for the duration of the tone signal.

4. The combination defined in claim 1, and which includes circuitry connected to the first and second circuit means and responsive to said tone signal received before a predetermined time after the commencement of playback when the messages recorded on said message storage means are being transmitted over the telephone line to re-introduce said rewind signal to the telephone answering system to cause the message storage means to return to its reference position.

5. The combination defined in claim 4, and which includes further circuit means connecting said last-named circuitry to said up-down counter to clear the up-down counter to its zero position.

* * * * *

XR 3,903,369

REEXAMINATION CERTIFICATE (963rd)

United States Patent [19] | [11] B1 3,903,369

Darwood | [45] Certificate Issued Dec. 13, 1988

[54] TELEPHONE ANSWERING SYSTEM WITH REMOTE PLAYBACK

[75] Inventor: James R. Darwood, Paramount, Calif.

[73] Assignee: Fortel, Inc., Compton, Calif.

Reexamination Request:
No. 90/001,087, Sep. 12, 1986

Reexamination Certificate for:

| | |
|---|---|
| Patent No.: | 3,903,369 |
| Issued: | Sep. 2, 1975 |
| Appl. No.: | 460,921 |
| Filed: | Apr. 15, 1974 |

[51] Int. Cl.[4] .................................... H04N 7/00
[52] U.S. Cl. .................................... 379/77; 360/72.3
[58] Field of Search .................... 179/6.07, 6.11; 360/72, 360/137

[56] References Cited

U.S. PATENT DOCUMENTS

| | | | |
|---|---|---|---|
| 3,395,401 | 7/1968 | Silverman | 360/32 |
| 3,627,228 | 12/1971 | Wolfe | 242/207 |
| 3,673,332 | 6/1972 | Muller et al. | 179/6 E |
| 3,894,188 | 7/1975 | Konno | 179/6.11 |

FOREIGN PATENT DOCUMENTS

| | | |
|---|---|---|
| 29-8336 | 12/1954 | Japan . |
| 47-7428 | 3/1972 | Japan . |
| 48-14205 | 2/1973 | Japan . |

OTHER PUBLICATIONS

English Translation of JP48-14205-15 pgs.-provided by Requestor.
English Translation of JP29-8336-9 pgs. provided by Requester.
English Translation of JP47-7428-16 pgs. provided by Requestor.

*Primary Examiner*—Aristotelis M. Psitos

[57] ABSTRACT

A magnetic tape-type of telephone answering system is provided which is capable of being operated from a remote point. Remote control is achieved, in the embodiment to be described, by the calling party transmitting a single tone of a predetermined frequency over the telephone line for a short time interval. In response to the tone, the telephone answering system automatically rewinds the message tape to its origin position, and it then plays back all the accumulated messages recorded on the message tape and causes the messages to be transmitted to the calling party over the telephone line. The system to be described contains an up-down counter which counts up to a particular count as the message tape is being rewound under the remote control, and which then counts down to zero as the messages on the message tape are played back and transmitted over the telephone line. The message tape is automatically stopped after the last message has been played back and transmitted to the calling party, and the system is again set to its normal operational mode to respond to any additional messages which may be received. The system is also capable of a remote backspace control, which is effectuated by transmitting the tone during the playback mode, and after a predetermined time has elapsed from the initiation of the playback mode. The amount of backspace is determined by the duration of the tone signal transmitted during the playback mode.

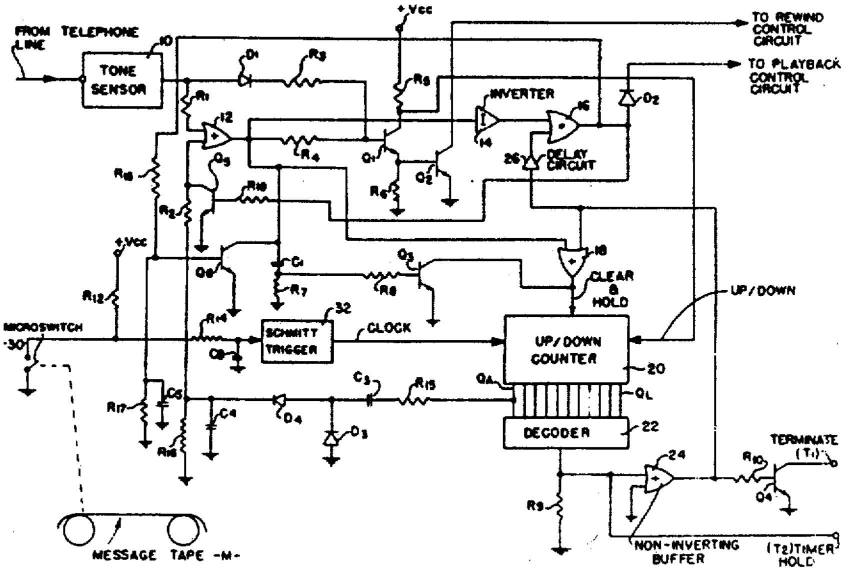

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-5 is confirmed.

* * * * *